Patented Feb. 1, 1938

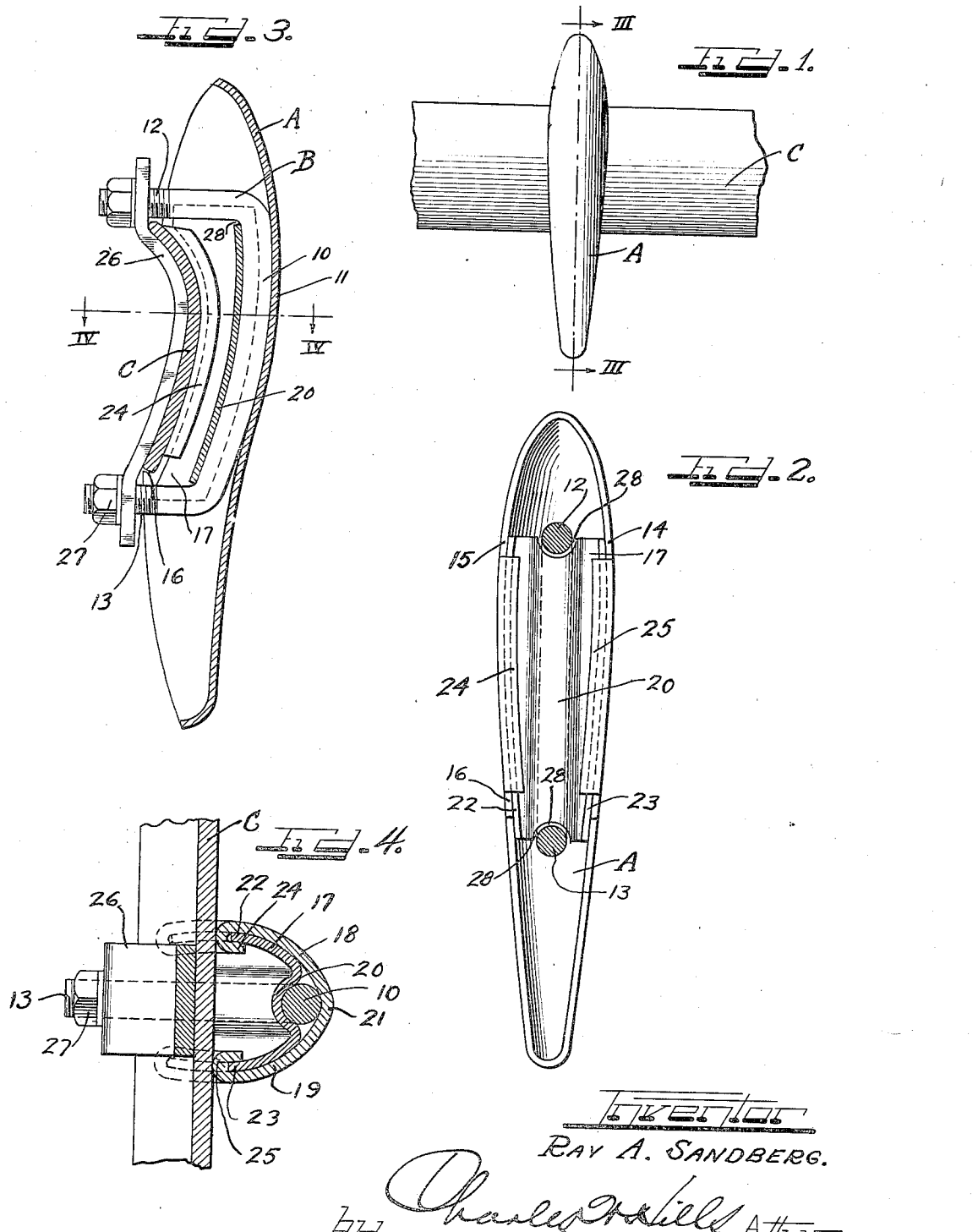

2,107,048

UNITED STATES PATENT OFFICE 2,107,048

BUMPER GUARD

Ray A. Sandberg, Waukegan, Ill., assignor to Oakes Products Corporation, North Chicago, Ill., a corporation of Michigan Application February 15, 1937, Serial No. 125,767

8 Claims. (Cl. 293—55)

My invention relates to bumper guards and concerns particularly improved means for securing the guards to a bumper bar.

In my improved structure I use a U-bolt anchored at its yoke against the back of the guard body with its legs projected rearwardly to receive between them the bumper bar to be protected and with the ends of the legs threaded so that the bumper bar may be clamped between the edges of the guard body and a strap received on the bolt legs.

An important object of the invention is to provide simplified and improved means for anchoring the bolt to the guard body and preferably with the bolt free to shift slightly and to swing so that when the clamping nuts on the bolt legs are drawn up, the guard body may securely seat itself along its side edges against the front face of the bumper impact bar.

My improved structure is clearly shown on the accompanying drawing, in which drawing—

Figure 1 shows part of a bumper bar with the guard mounted thereon;

Figure 2 is an enlarged inner side view of the bumper guard;

Figure 3 is an enlarged section on plane III—III of Figure 1; and

Figure 4 is an enlarged section on plane IV—IV of Figure 3.

The bumper guard may be of any suitable shape. As shown, the body A of the guard is of oblong or elongated oval shape and is preferably formed or stamped from sheet metal. A U-bolt B has its yoke part 10 bent to fit against the curved front wall 11 of the body A with the bolt legs 12 and 13 parallel and extending rearwardly outwardly from the body beyond the side edges 14 and 15 thereof, the distance between the legs being sufficient to receive between them the bumper impact bar C to which the guard is to be attached. The side walls 14 and 15 are recessed, as shown at 16, to receive the bumper bar and the edges along these recesses are curved or shaped to fit the curvature of the front face of the bumper bar.

To securely anchor the U-bolt to the guard body a sheet metal strap 17 is employed, this strap extending between the legs of the bolt and in intimate engagement with the curved sides 18 and 19 of the body A and with the strap having extending longitudinally along its median line the rearward substantially semi-circular deflection 20 for receiving the bolt yoke 10 so that when the strap is secured the bolt yoke will be clamped between the deflection and the inner side of the crest portion 21 of the guard body, as clearly shown in Figure 4.

The strap 17 may be secured as by welding it to the side wall portions 18 and 19 of the body A. Another efficient manner for securing the straps is to deflect around its edge portions 22 and 23 the wings 24 and 25 provided on the body side walls 18 and 19 along the recesses 16 which receive the bumper bar C. With these wings curled around the strap edge portions 22 and 23, the strap will be securely held in place to anchor the bolt, and the curled over portions may have their outer edges curved to accurately fit against the front face of the bumper bar, as clearly shown in Figure 3.

A clamping bar 26 is provided which is apertured at its ends to receive the bolt legs, the bar between its apertured ends being curved to accurately fit the rear face of the bumper bar so that when the nuts 27 on the threaded ends of the bolt are tightened the bumper bar C will be intimately and securely clamped between the bar 26 and the edges of the curled over strap securing portions 24 and 25 on the guard body.

Although the strap 17 securely anchors the U-bolt to the guard body, such anchorage forms a fulcrum for the bolt which permits sufficient swing movement of the bolt and body so that when the guard is applied to a bumper bar and the nuts 27 are tightened, the bumper bar engaging edges of the body may accurately seat themselves against the bumper bar surface without straining the bolt. Sufficient clearance 28 may also be left between the upper and lower edges of the strap 17 and the bolt legs to permit sufficient relative vertical movement between the bolt and the guard body for assuring accurate vertical alignment and engagement of the guard body with the bumper bar.

I thus provide a simple, economically manufactured, and efficient bumper guard whose securing means will assure accurate seating and alignment of the guard body on a bumper bar. I do not desire to be limited to the exact structure and arrangement shown and described, as changes and modifications may be made which still come within the scope of the invention.

I claim as follows:

1. A bumper guard structure comprising an oblong cup-shaped body, a U-bolt having its yoke within the body and with its legs projecting through the open rear side thereof, a plate fitting into said body and shaped to cooperate with the front wall of the body to form a fulcrum support for the bolt yoke, and a clamping means cooperable with the outer ends of said bolt for clamping said body with its opening edges against the front face of a bumper bar.

2. A bumper guard structure comprising an oblong cup-shaped impact receiving body, a U-bolt having its yoke portion within the body and extending through the open rear side of the body for straddling a bumper bar to which the guard structure is to be secured, and a plate within said body between which and the front wall of said body said bolt is anchored at its yoke portion.

3. A bumper guard structure comprising an elongated cup-shaped impact receiving body for engaging with its edges against the front face of a bumper bar, a U-bolt having its yoke portion within the body and its legs extending outwardly through the open rear side thereof, a metal strap engaging in said body and being deflected to receive the yoke portion of said bolt and to clamp said portion against the front wall of said body, portions of the edges of said body being deflected around the edges of said strap to secure it in bolt clamping position.

4. A bumper guard structure comprising an elongated cup-shaped body, a U-bolt having its yoke portion within said body and its legs extending outwardly through the open rear side of the body for straddling a bumper guard against whose front impact surface said guard body is to be clamped, securing means within said body for engagement with the yoke portion of the bolt to secure the bolt to the body, clamping means adjustable on the legs of said U-bolt for engaging with the rear side of the bumper bar to effect clamping engagement of said body against the front face of the bumper bar, said securing means being such as to permit sufficient movement of said body for accurate seating thereof at its edges against the front surface of the bumper bar during securing of the clamping means.

5. A bumper guard structure comprising an elongated cup-shaped impact receiving body part, a U-bolt having its yoke portion within said body part and its legs extending outwardly through the open end of the body part for straddling a bumper bar to which said body part is to be applied, a strap fitting into said body part and deflected around the yoke portion of the bolt for securing the yoke against the inner side of the front wall of said body part along the median line thereof, portions of the edges of said body part being deflected around the ends of said strap to rigidly hold it in bolt securing position, said deflected over edges forming seats for engagement of said body with the front face of a bumper bar, and adjustable clamping means on the legs of said bolt for engagement with the rear face of the bumper bar for securing the body member against the front face thereof.

6. A bumper guard structure comprising an elongated cup-shaped impact receiving body part, a U-bolt having its yoke portion within said body part and its legs extending outwardly through the open end of the body part for straddling a bumper bar to which said body part is to be applied, a strap fitting into said body part and deflected around the yoke portion of the bolt for securing the yoke against the inner side of the front wall of said body part along the median line thereof, portions of the edges of said body part being deflected around the ends of said strap to rigidly hold it in bolt securing position, said deflected over edges forming seats for engagement of said body with the front face of a bumper bar, and adjustable clamping means on the legs of said bolt for engagement with the rear face of the bumper bar for securing the body member against the front face thereof, the engagement of said straps with the U-bolt yoke part being sufficiently yielding for lateral swing of said body part for accurate engagement of its seating portions with the front face of the bumper bar.

7. A bumper guard structure comprising an elongated cup-shaped impact receiving body for engagement with its edges against the front face of a bumper bar to extend above and below the bumper bar, portions of the edges of said body part being deflected to form seats for engagement of said body with the front face of a bumper bar, a plate within said body abutting said deflected portions to be thereby retained within said body part, and a U-bolt having its yoke within said body and with its legs extending outwardly through the open end thereof for straddling the bumper bar, said plate forming a fulcrum seat for the yoke of said bolt.

8. A bumper guard structure comprising an elongated cup-shaped impact receiving body, portions of the edges of said body being deflected into the body to form seats for engagement of said body with the front face of a bumper bar, a plate within said body extending between the sides thereof and seated against said deflected portions to be thereby secured within said body, a U-bolt having its yoke part within said body and its legs extending outwardly through the open end thereof for straddling a bumper bar, said plate being deflected to form a fulcrum seat for the bolt yoke.

RAY A. SANDBERG.